(12) United States Patent
Bharadwaj et al.

(10) Patent No.: US 10,225,804 B2
(45) Date of Patent: *Mar. 5, 2019

(54) POWER CONTROL FOR UPLINK TRANSMISSIONS

(71) Applicant: QUALCOMM Incorporated, San Diego, CA (US)

(72) Inventors: Arjun Bharadwaj, Poway, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,641

(22) Filed: May 1, 2018

(65) Prior Publication Data

US 2018/0249421 A1    Aug. 30, 2018

Related U.S. Application Data

(63) Continuation of application No. 15/379,350, filed on Dec. 14, 2016, now Pat. No. 9,980,233.

(Continued)

(51) Int. Cl.
*H04L 5/00* (2006.01)
*H04B 17/318* (2015.01)
(Continued)

(52) U.S. Cl.
CPC ........ *H04W 52/146* (2013.01); *H04B 17/318* (2015.01); *H04B 17/336* (2015.01);
(Continued)

(58) Field of Classification Search
CPC . H04W 52/146; H04W 52/10; H04W 52/241; H04W 52/242; H04W 52/245;
(Continued)

(56) References Cited

U.S. PATENT DOCUMENTS 8,340,593 B2 * 12/2012 Yang ................... H04W 52/241
455/101
8,761,033 B2   6/2014 Abraham et al.
(Continued)

FOREIGN PATENT DOCUMENTS

CN    101243616 B    10/2011
CN    104812048 A    7/2015
(Continued)

OTHER PUBLICATIONS

International Search Report and Written Opinion—PCT/US2016/066983—ISA/EPO—dated Mar. 13, 2017.
Taiwan Search Report—TW105141611—TIPO—dated Sep. 27, 2018.

*Primary Examiner* — William Nealon
(74) *Attorney, Agent, or Firm* — Arent Fox, LLP

(57) ABSTRACT

A method, an apparatus, and a computer-readable medium for wireless communication are provided. In one aspect, the apparatus is configured to determine a power control command including a target receiver power level for uplink transmission. The apparatus is configured to transmit a frame to a wireless device. The frame may include information associated with the determined target receiver power level for uplink transmission from the wireless device and a transmit power level at which the frame is to be transmitted. The information may enable the wireless device to compute a transmit power for the uplink transmission. The frame may include power control commands for other wireless devices.

36 Claims, 9 Drawing Sheets

Related U.S. Application Data

(60) Provisional application No. 62/269,039, filed on Dec. 17, 2015.

(51) Int. Cl.
    *H04W 52/14*         (2009.01)
    *H04B 17/336*       (2015.01)
    *H04W 84/12*        (2009.01)
    *H04W 52/10*        (2009.01)
    *H04W 52/24*        (2009.01)
    *H04B 7/0452*       (2017.01)
    *H04W 52/36*        (2009.01)
    *H04W 52/40*        (2009.01)

(52) U.S. Cl.
    CPC ......... *H04W 52/10* (2013.01); *H04W 52/241* (2013.01); *H04W 52/242* (2013.01); *H04W 52/245* (2013.01); *H04W 84/12* (2013.01); *H04B 7/0452* (2013.01); *H04L 5/0007* (2013.01); *H04L 5/0023* (2013.01); *H04W 52/365* (2013.01); *H04W 52/367* (2013.01); *H04W 52/40* (2013.01)

(58) Field of Classification Search
    CPC . H04W 52/365; H04W 52/367; H04W 52/40; H04W 84/12; H04B 17/318; H04B 17/336; H04L 5/0007
    USPC ...................................................... 455/422.1
    See application file for complete search history.

(56) References Cited

U.S. PATENT DOCUMENTS

| | | | |
|---|---|---|---|
| 9,031,044 B2* | 5/2015 | Sampath | H04W 52/241 370/335 |
| 9,980,233 B2* | 5/2018 | Bharadwaj | H04W 52/146 |
| 2002/0009061 A1* | 1/2002 | Willenegger | H04L 1/20 370/328 |
| 2005/0152313 A1* | 7/2005 | Cave | H04W 74/08 370/333 |
| 2010/0046479 A1* | 2/2010 | Sampath | H04W 52/241 370/335 |
| 2011/0111766 A1* | 5/2011 | Yang | H04W 52/241 455/452.2 |
| 2013/0286959 A1* | 10/2013 | Lou | H04W 72/04 370/329 |
| 2015/0319700 A1* | 11/2015 | Oteri | H04W 52/28 455/127.1 |
| 2016/0050634 A1* | 2/2016 | Seok | H04W 52/146 370/338 |
| 2016/0066318 A1* | 3/2016 | Pereira | H04L 5/0007 370/329 |
| 2016/0100370 A1* | 4/2016 | Rong | H04W 52/06 455/522 |
| 2016/0198358 A1* | 7/2016 | Rong | H04W 72/1268 370/235 |
| 2017/0181102 A1 | 6/2017 | Bharadwaj et al. | |

FOREIGN PATENT DOCUMENTS

| | | |
|---|---|---|
| WO | WO-2011002737 A1 | 1/2011 |
| WO | WO-2014190334 A1 | 11/2014 |
| WO | 2015038930 A1 | 3/2015 |
| WO | WO-2015031431 A1 | 3/2015 |

\* cited by examiner

POWER CONTROL FOR UPLINK TRANSMISSIONS

CROSS-REFERENCE TO RELATED APPLICATION(S)

This application is a continuation of U.S. patent application Ser. No. 15/379,350, entitled "POWER CONTROL FOR UPLINK TRANSMISSIONS," filed on Dec. 14, 2016, which claims the benefit of U.S. Provisional Application Ser. No. 62/269,039, entitled "POWER CONTROL FOR UPLINK TRANSMISSIONS," filed on Dec. 17, 2015, all of which are assigned to the assignee of the present application and hereby expressly incorporated by reference herein in their entireties.

BACKGROUND

Field

The present disclosure relates generally to communication systems, and more particularly, to power control for uplink transmissions.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., an access point) for wireless communication. The apparatus is configured to determine a power control command for a first station to perform uplink (UL) multi-user (MU) multiple-input-multiple-output (MIMO) (UL MU-MIMO) transmission or UL orthogonal frequency-division multiple access (UL OFDMA) transmission. The power control command may be associated with a first station identifier that identifies the first station for which the power control command is intended. The apparatus is configured to transmit a frame to the first station. The frame may include a plurality of power control commands intended for a plurality of stations including the power control command intended for the first station identified by a first station identifier. The power control command intended for the first station enables the first station to compute a transmit power for UL MU-MIMO transmission or UL OFDMA transmission.

Another aspect of this disclosure provides an apparatus (e.g., a station) for wireless communication. The apparatus is configured to receive a first frame from an access point. The first frame includes a plurality of power control commands intended for a plurality of stations including a power control command intended for the first station for UL MU-MIMO transmission or UL OFDMA transmission. The apparatus may be configured to determine a transmit power for transmitting a second frame to the access point based on the power control command and to transmit the second frame based on the determined transmit power.

DETAILED DESCRIPTION

Figure 1:
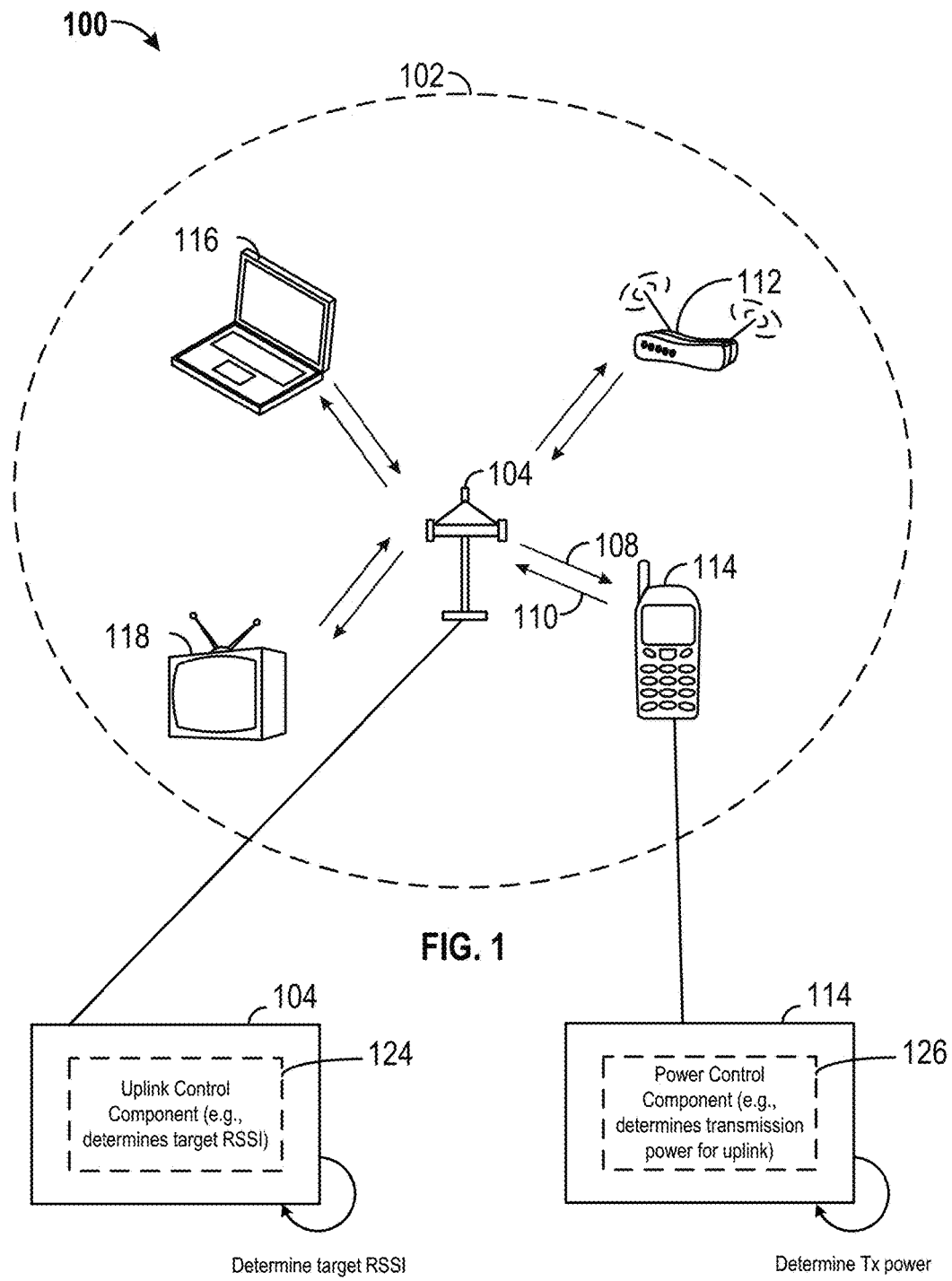
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include an uplink control component 124 to perform procedures related to uplink power control. In this example, the uplink control component 124 may be configured to determine a target receiver power level for uplink transmission. The uplink control component 124 may be configured to transmit a frame to a wireless device. The frame may include information associated with the determined target receiver power level for uplink transmission and a transmit power level at which the frame is to be transmitted.

In another aspect, the STA 114 may include one or more components for performing various functions. For example, the STA 114 may include a power control component 126 to perform procedures related to uplink power control. In this example, the power control component 126 may be configured to receive a frame from an access point. The frame may include information that indicates a determined target receiver power level at the access point or a transmit power level to be used by the STA 114 for uplink transmission. The power control component 126 may be configured to transmit a second frame to the access based on the received information In wireless networks, transmission power control is generally required for uplink multi-user transmissions. For example, in networks that support orthogonal frequency-division multiple access (OFDMA) and/or multi-user multiple-input-multiple-output (MU-MIMO), some form of transmission power control may be required. In OFDMA, power control may be used to manage interference between different resource units (RUs) by controlling power imbalance between STAs scheduled in adjacent RUs. An RU may be, for example, a subset of tones within a symbol. An RU may have 26 tones, 52 tones, 106 tones, 242 tones, 484 tones, 996 tones, 2×996 tones, or some other number of tones. Transmission power control may also be used to meet power spectral density (PSD) requirements and mitigate leakage. In MU-MIMO, transmission power control may be used to manage inter-stream (e.g., multiple spatial streams) interference by controlling power imbalance between STAs scheduled for transmission and interference from overlapping BSSs (OBBSs). For example, in MU-MIMO, all STAs or a group of STAs may be scheduled for or allocated on the same RU, and therefore, transmit on the same frequency but on different spatial streams. In another example, such as in OFDMA, the STAs may be scheduled for transmission at the same time but at different frequencies. The power control may also be used to ensure that UL transmissions do not exceed the receiving dynamic range of the AP.

When multiple users are scheduled for uplink transmission at the same time, the near-far effect may occur. The near-far effect is a condition in which a device receives a strong signal and is unable to detect a weaker signal. To minimize the impact of the near-far effect on receiver performance, a power (e.g., transmit power) and rate (e.g., modulation and coding scheme (MCS) rate) control scheme is needed that enables an access point, for example, to have flexibility to control transmission power and rate for each station in OFDMA and MU-MIMO transmissions.

Figure 2:
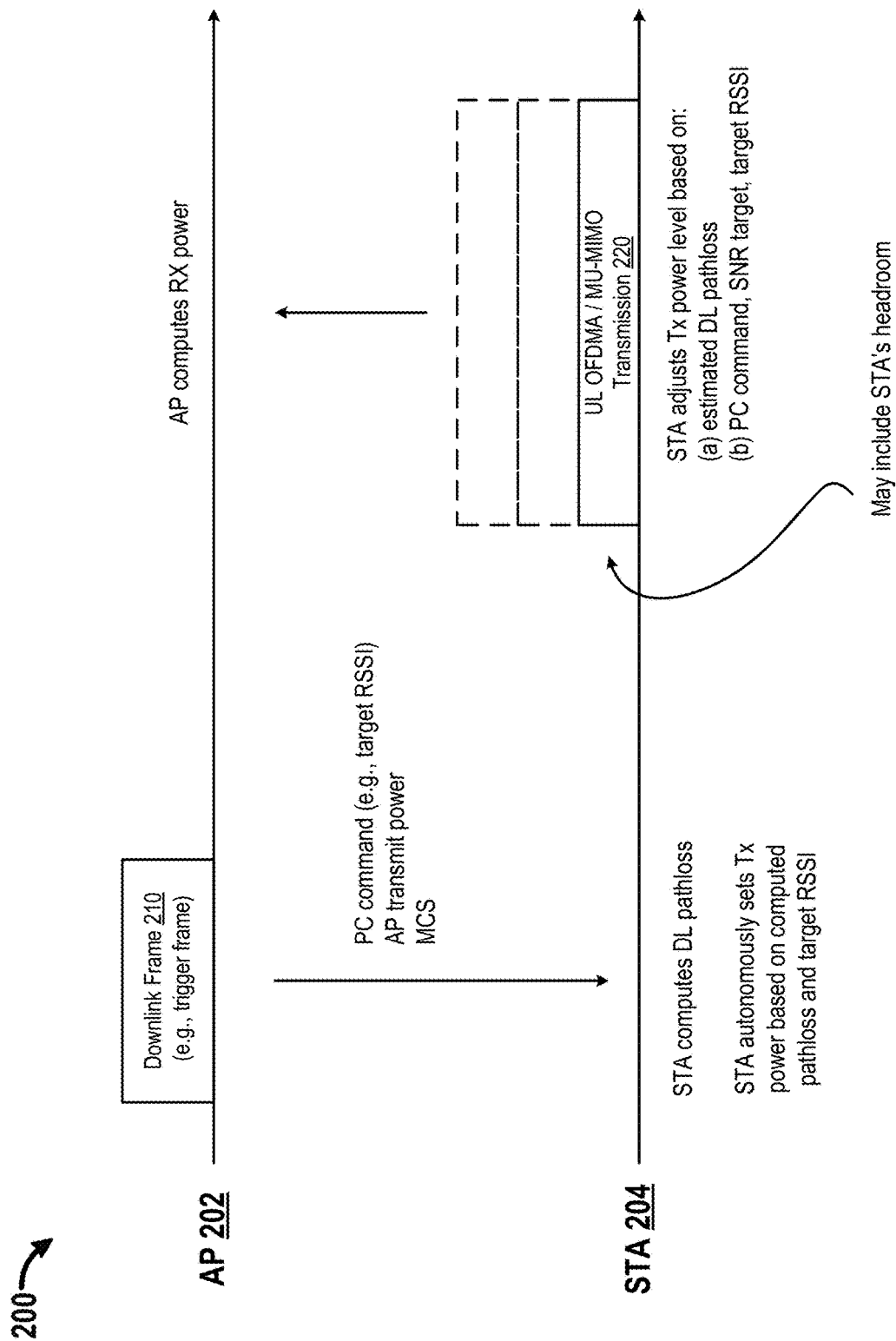
FIG. 2 illustrates a method of power control command signaling using an Rx power level option.

FIG. 2 illustrates a method of power control command signaling. Referring to FIG. 2, an AP may be serving multiple STAs within a BSS. The AP may schedule the STAs for UL MU transmission using open loop control (e.g., power control with no or limited feedback from STAs). In basic open loop control, all of the STAs scheduled for UL MU transmission may be given the same information for power control. For example, the STAs may determine a signal-to-noise ratio (SNR) target at the AP based on an MCS-SNR table. The table may be indicated explicitly or implicitly by the AP (e.g., transmitted by the AP through an information element or during association). In this example, the AP may indicate an MCS, and the STA may look up the SNR target based on the indicated MCS, and determine a Tx power based on the SNR target. However, the selection of the target SNR based on a table may result in problems during UL MU transmissions. For example, the target SNR and the received SNR at the AP may be different. Hardware limitations may cause inaccurate STA Tx power levels as a result of received signal strength indicator (RSSI) measurement errors and Tx power calibration errors (e.g., the STA may be transmitting at a higher or lower Tx power than intended). Furthermore, UL and DL pathlosses may not be reciprocal (or the same). DL RSSI may be performed over 20 megahertz (MHz) channels whereas UL path loss for smaller RUs may differ from DL path loss due to frequency selectivity. For example, if the entire uplink bandwidth is 40 MHz and is divided among 8 users, each user may have 5 MHz for uplink transmission. However, the pathloss for a 20 MHz channel could be different for the pathloss of a 5 MHz channel (or some other smaller channel such as a 10 MHz channel). The more bandwidth there is to average over, the lesser the frequency selectivity, which may reduce the variation of the channel (e.g., there may be a deep fade within the 5 MHz channel). As such, a target SNR alone may be insufficient for successful decoding of UL transmissions received at the AP. A power imbalance between scheduled STAs may be larger than the tolerance levels, and the required SNRs may vary based on a number of users in UL MU-MIMO (or UL OFDMA).

In another scenario, when multiple STAs are scheduled for UL MU transmissions, one of the STAs may have a high packet error rate (PER) in multiple UL MU transmissions. The received SNR for the STA at the AP may be lower than that required for successful decoding. Presently, the AP may have limited options to address this scenario. In one solution, the AP may adjust the power control command to increase target SNR for all users and all MCS values. However, this solution may be inefficient for users that are unaffected by the high PER. Further, increasing target SNR may reduce overall throughput because when more STAs transmit at higher power there is greater interference. In another solution, the AP may lower MCS for the affected STA. However, if the target SNR is determined based on the MCS-SNR table, then the problem may persist because the STA Tx power is also lowered. Additionally, a conservative scheduling approach (e.g., with a large SNR margin) may compromise UL MU throughput because the SNR margin may have to be quite high (e.g., greater than 6 dB) and increasing the transmit power may increase interference and lower overall throughput.

In other words, STAs need to transmit with enough power to ensure adequate SNR at the AP for the assigned MCS. Higher than needed transmit power levels may cause unnecessary interference to other users, which is especially true for low MCS transmissions with loose error vector magnitude (EVM) requirements. It is helpful for an AP to be able to adjust power and transmission rate independently for each STA in an UL MU transmission. This enables the AP to adapt to different channel conditions for both single user and MU-MIMO transmissions. In an aspect, in a modified open loop power control scheme, to compensate for different data reception scenarios, the AP may select individualized MCSs and individualized target SNR for each STA scheduled for UL MU transmission based on each STA's hardware limitations as well as based on other STAs and the MCS scheduled in the UL MU transmission. For example, if 4 STAs are scheduled for UL MU transmission, the AP may provide different power control commands for each of the 4 STAs based on the hardware limitations of each of the STAs. In another aspect, the power and transmission rate control algorithm may be internal to the implementation of the AP and may be transparent to the STA. In this aspect, the AP need not advertise the MCS-SNR table, and the AP receiver design and performance details may be proprietary.

In an aspect, to implement an individualized power control for UL MU transmission, an AP 202 may transmit a downlink frame 210 (e.g., a trigger frame or another type of downlink frame) to a STA 204. The downlink frame 210 may indicate a Tx power used by the AP 202 to transmit the downlink frame 210, an MCS to be used by a particular STA for uplink transmission, and/or a power control command for an uplink MU-MIMO (or OFDMA) transmission 220 for the particular STA. In an aspect, the Tx power may be determined by the AP 202 based on an MCS and other factors, such as a number of users, an inter-stream management configuration of the AP 202, and grouping algorithms. For example, for an MCS value of 7 with 3 users, the AP 202 may select a Tx power level of −40 dBm. In another example, for an MCS value of 9 with 3 users, the AP 202 may select a Tx power level of −25 dBm. As such, the algorithm used to determine the specific Tx power level may depend on AP configurations. In addition to the Tx power, the downlink frame 210 may include one or more STA identifiers (IDs), such as an association identifier (AID), for which the downlink frame 210 is intended. Each power control command and/or MCS indicated in the downlink frame 210 may be associated with a STA ID to provide individualized power control. The downlink frame 210 may further include other parameters such as an RU size (e.g., 26-tone RU, 52-tone RU, 106-tone RU, etc.), a bandwidth, transmission duration, a number of spatial streams allowed per STA, and/or an amount of padding to be used at the end of the frame. Each of the parameters may be different or the same among the different STAs served by the AP 202.

The power control command from the AP 202, as shown in FIG. 2, may indicate an SNR target for each STA. The AP 202 may have several options for indicating the SNR target in the power control command. In a first option, the power control command may indicate, for example, a target RSSI for each STA scheduled in the downlink frame 210 based on a STA ID associated with each STA. In this option, the STA 204 may compute a downlink pathloss based on the received downlink frame 210. For example, the STA 204 may measure the RSSI of the received downlink frame 210, and based on the measured RSSI and the indicated Tx power level of the downlink frame 210 ($Tx_{pwr}^{AP}$(dBm)), the STA 204 may determine the downlink pathloss (e.g., downlink pathloss=Tx power−measured RSSI). In an aspect, the indicated Tx power level may combine the power from all transmit antennas at the AP 202, although the STA may not know the number of antennas at the AP 202. The Tx power level may be the average power in a 20 MHz unit (e.g., resource unit), because in some cases, the STA 204 may not know the bandwidth of the downlink frame 210 (or trigger frame) when the downlink frame 210 is transmitted according to previous standards. In another aspect, the Tx power level may have a 1 dB resolution and be within a range [−20 40] dBm. The Tx power level may be represented using 6 bits, in which values 0 to 60 map to −20 dBm to 40 dBm and values 61, 62, and 63 may be reserved. In another aspect, the target RSSI may correspond to the average RSSI over the AP 202's antennas and may have a 1 dB resolution. The target RSSI may be represented using 7 bits, with values 0 to 90 mapping to the range [−110, −20] dBm at 1 dB resolution. A value of 127 may correspond to a request for the STA 204 to use its max transmit power allowed for the assigned MCS. The lower end of the range may be useful for power control in narrowband transmissions like 26-tone RUs, and the higher end of the range may be useful for power control when the AP 202 and the STAs are close together.

The STA 204 may determine the Tx power used for UL transmission based on the computed downlink path loss, the power control command, and/or an SNR target (e.g., $Tx_{pwr}^{STA}(dBm)=PL_{DL}(dB)+Target_{RSSI}(dBm)$). The STA 204 may determine a Tx power by adding the target RSSI to the computed downlink pathloss, and using the sum as the Tx power for uplink transmission. In a second option, the AP 202 may indicate an SNR correction, which may be signaled as a value, and the value may be a delta to be applied to the SNR indicated in an MCS-SNR table. In an aspect, the SNR target may be indicated in the downlink frame 210. In another aspect, the downlink frame 210 may indicate an MCS in addition to the SNR correction. The STA 204 may determine an SNR associated with the MCS (e.g., based on an MCS-SNR table). The STA 204 may adjust the SNR indicated in the MCS-SNR table using the SNR correction in the downlink frame 210. Based on the adjusted target SNR, the STA 204 may determine a Tx power level and transmit uplink OFDMA or MU-MIMO transmissions to the AP 202 based on the determined Tx power level. In a third option, the power control command may be indicated with a link margin (LM), which may be a combination of AP Tx power and receiver sensitivity. The LM may be defined based on Eq. 1:

$$LM_{index} \triangleq P_{tx\_AP} + R_{sensitivity\_AP}$$

Referring to Eq. 1, the LM is defined as the sum of the AP Tx power ($P_{tx\_AP}$) and the target RSSI ($R_{sensitivity\_AP}$). Upon receiving the LM in the downlink frame 210, the STA 204 may subtract from the LM the measured downlink RSSI based on the received downlink frame 210, and the difference may be the Tx power to be used by the STA 204 for uplink transmission. In this third option, the STA 204 may not need to calculate the downlink pathloss to determine the Tx power for UL MU transmission.

To enable the AP 202 to determine an appropriate power control command, the STA 204 may signal to the AP 202 certain Tx power limitations associated with the STA 204. In one aspect, the STA 204 may signal a current STA Tx power ($P_{STA}^{Tx}$). In another aspect, the STA 204 may signal a headroom value, which may be determined based on headroom=$P_{MCS}^{MAX} - P_{MCS}^{Tx}$, in which $P_{MCS}^{MAX}$ is the maximum transmit power for a MCS and $P_{MCS}^{Tx}$ is the current transmit power for the MCS. The headroom may indicate an available increase in the amount of transmit power for the MCS by the STA 204, and the AP 202 may not request the STA 204 to increase its power beyond the amount indicated in the headroom value. The headroom value may be signaled in the triggered UL MU transmission to assist in the AP's MCS selection. The headroom value may be signaled with 6 bits of which 5 bits may be used to indicate a value of 0 to 31, corresponding to a range of [0, 31] dB. A remaining bit may be a flag used to indicate whether the minimum transmit power of a current MCS is reached by the STA 204. For example, if the flag is set to 1, then the STA 204 is already transmitting at its minimum capable transmit power for the current MCS and the AP 202 may not require the STA 204 to further reduce its transmit power. If the flag is set to 0, then the STA 204 is not transmitting at its minimum capable transmit power for the current MCS. In another aspect, the STA 204 may signal a rise over floor value based on rise over floor=$P_{MCS}^{Tx} - P_{min}$, in which $P_{min}$ corresponds to the minimum transmit power of the STA 204, and the rise over floor value represents the margin in which the current transmit power for an MCS exceeds the minimum transmit power of the STA 204. The rise over floor value may enable the AP 202 to determine how much lower a STA's Tx power may be reduced, for example. The STA 204 may signal a power amplifier backoff value for each MCS. Other power limitations may also be signaled from the STA 204 to the AP 202.

Figure 3:
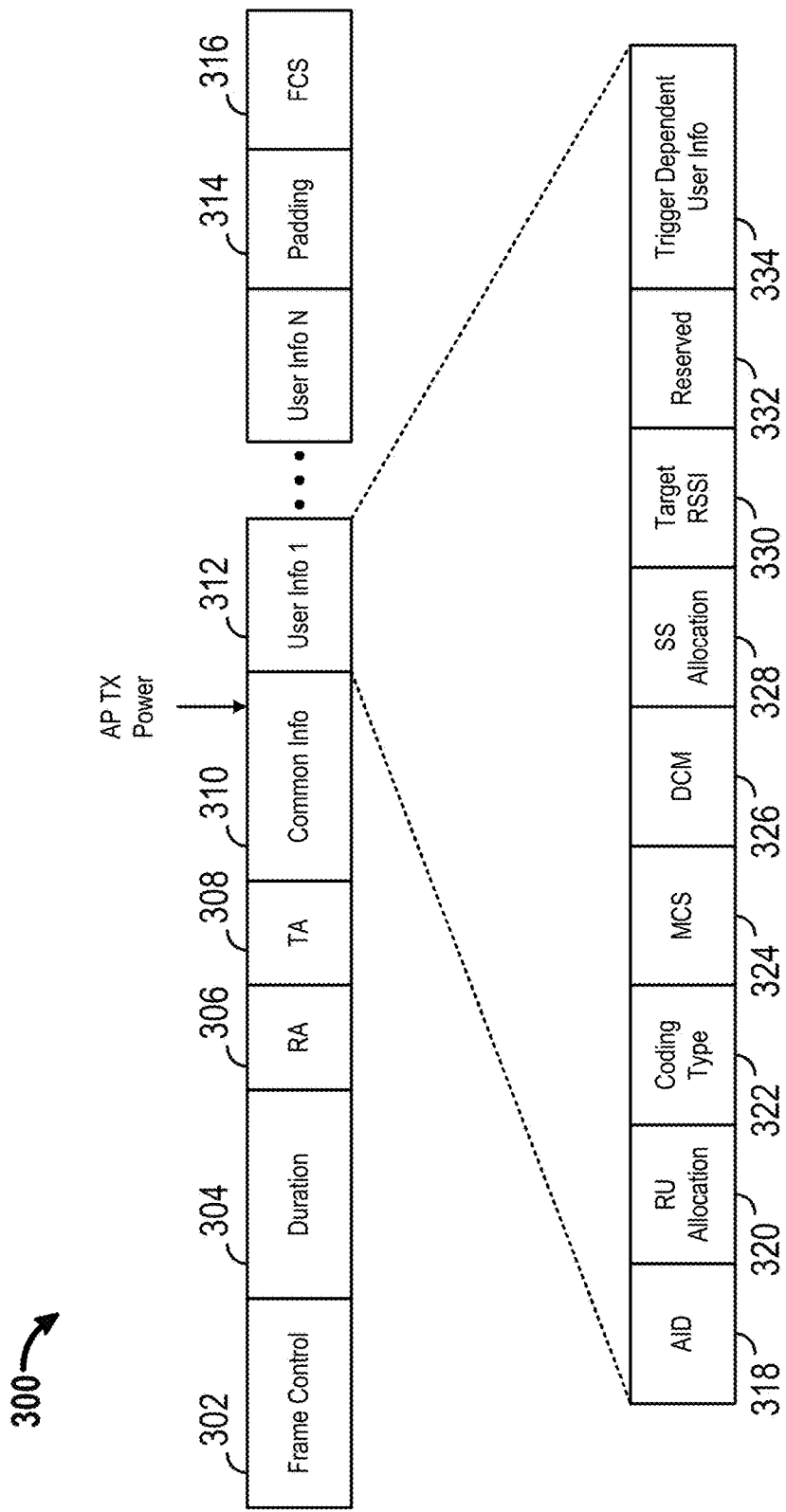
FIG. 3 illustrates an exemplary trigger frame that may correspond to the downlink frame in FIG. 2

FIG. 3 illustrates an exemplary trigger frame 300 that may correspond to the downlink frame in FIG. 2. The trigger frame 300 may solicit and allocate resources for UL MU transmission an interframe space (IFS) after the trigger frame 300. The trigger frame may include a frame control field 302, a duration field 304, a receiver address (RA) field 306, a transmit address (TA) field 308, a common info field 310, one or more user info fields 312, a padding 314, and a frame check sequence 316. The RA field 306 may identify the address of the recipient STA. If the trigger frame 300 has one recipient STA, then the RA field 306 is the MAC address of the STA. If the trigger frame 300 has multiple recipient STAs, then the RA field 306 may include a broadcast address. The TA field 308 may include the address of the device transmitting the trigger frame (e.g., the AP 202). The common info field 310 may include a number of subfields, including an AP TX power subfield that includes the transmit power level used by the AP to transmit the trigger frame 300. The transmit power level may represent the combined average power per 20 MHz bandwidth of all transmit antennas used to transmit the trigger frame 300.

Referring to FIG. 3, a user info field may include an association ID (AID) subfield 318, an RU allocation subfield 320, a coding type subfield 322, an MCS subfield 324, a dual carrier modulation (DCM) subfield 326, a spatial stream allocation subfield 328, a target RSSI subfield 330, a reserved subfield 332, and/or a trigger dependent user info subfield 334. The AID subfield 318 may identify the user for which the user info field is intended. The RU allocation subfield 320 may indicate the resource unit used by a STA identified in the AID subfield 318. The coding type subfield 322 indicates the code type (e.g., binary convolution coding or low-density parity-check coding). The MCS subfield 324 may indicate the MCS assigned to the STA identified in the AID subfield 318. The DCM subfield 326 indicates dual carrier modulation. The spatial stream allocation subfield 328 indicates the number of spatial streams to be used by the STA. The target RSSI subfield 330 indicates the target received signal power. The reserved subfield 332 allows for additional fields addressed per STA and the trigger dependent user info subfield 334 may include additional per user information. The padding subfield 314 extends the frame length to give the recipient STA more time to prepare a response. The FCS subfield 316 enables error detection of the trigger frame 300.

Figure 4:
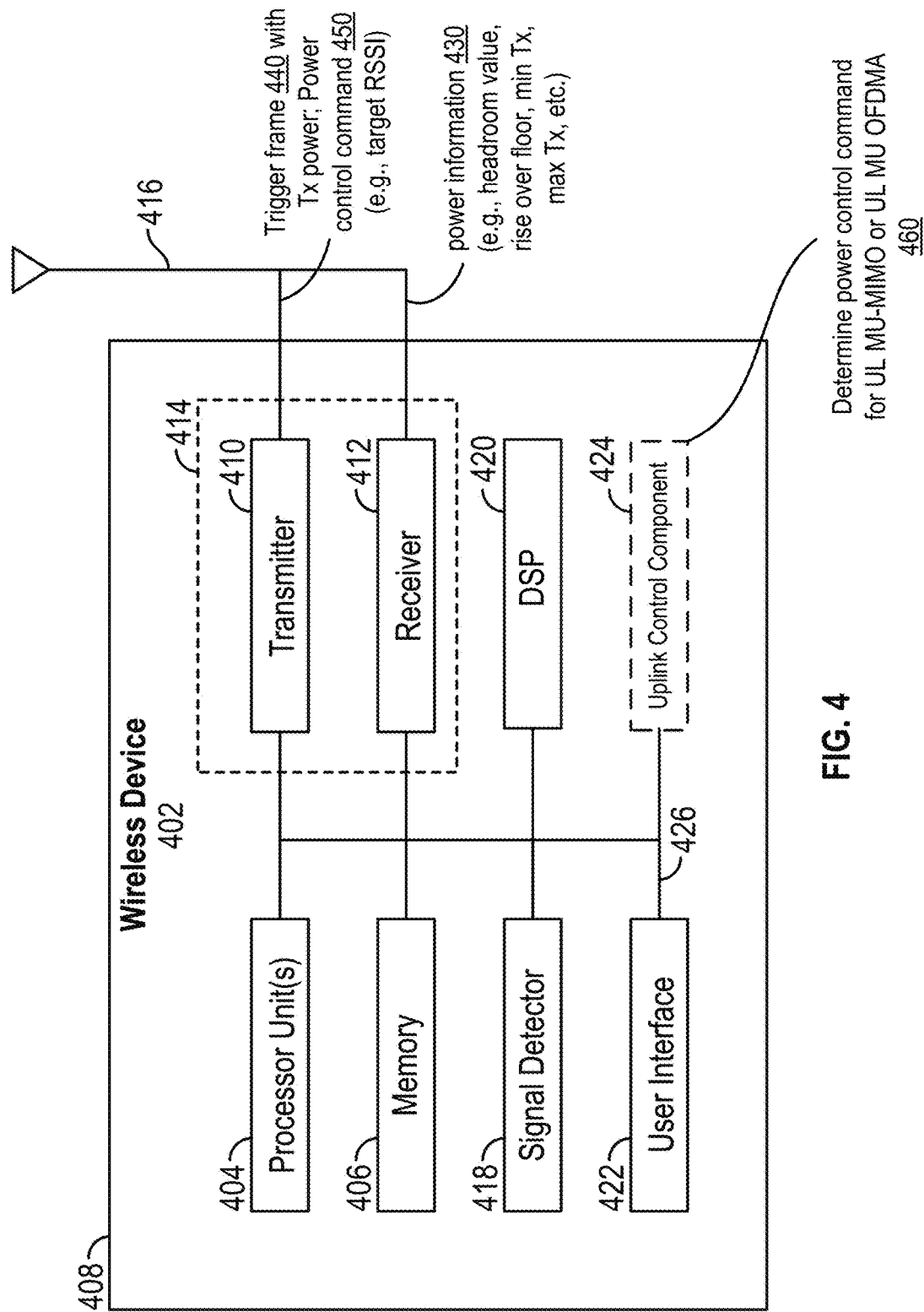
FIG. 4 shows an example functional block diagram of a wireless device that may be employed within the wireless communication system of FIG. 1.

FIG. 4 shows an example functional block diagram of a wireless device 402 that may be employed within the wireless communication system 100 of FIG. 1 for providing MU uplink power control. The wireless device 402 is an example of a device that may be configured to implement the various methods described herein. For example, the wireless device 402 may comprise the AP 104 or the AP 202.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable (by the processor 404, for example) to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408, and the wireless device 402 may include a transmitter 410 and/or a receiver 412 to allow transmission and reception of data between the wireless device 402 and a remote device. The transmitter 410 and the receiver 412 may be combined into a transceiver 414. An antenna 416 may be attached to the housing 408 and electrically coupled to the transceiver 414. The wireless device 402 may also include multiple transmitters, multiple receivers, multiple transceivers, and/or multiple antennas.

The wireless device 402 may also include a signal detector 418 that may be used to detect and quantify the level of signals received by the transceiver 414 or the receiver 412. The signal detector 418 may detect such signals as total energy, energy per subcarrier per symbol, power spectral density, and other signals. The wireless device 402 may also include a DSP 420 for use in processing signals. The DSP 420 may be configured to generate a packet for transmission. In some aspects, the packet may comprise a physical layer convergence protocol (PLCP) protocol data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

When the wireless device 402 is implemented as an AP (e.g., AP 104), the wireless device 402 may also comprise an uplink control component 424. The uplink control component 424 may be configured to determine 460 a power control command 450 for a station that enables UL MU-MIMO transmission or UL OFDMA transmission. The power control command may be associated with a station identifier identifying the station for which the power control command is intended. The uplink control component 424 may be configured to transmit a frame to the station identified by the station identifier. The frame may include the determined power control command for UL MU-MIMO or UL OFDMA and the station identifier. The determined power control command for the station is different (or separate) from other power control commands for other stations associated with the access point. In an aspect, the power control command indicates at least one of a target RSSI expected at the access point, an SNR correction to be applied at the station, or a link margin. In another aspect, the frame may be a trigger frame 440, and the trigger frame may include the target RSSI and a transmit power level used to transmit the trigger frame. In another aspect, the target RSSI may indicate an average RSSI over a set of antennas associated with the access point. In another aspect, the trigger frame may be intended for a plurality of stations, and the trigger frame may include a separate power control command for each station of the plurality of stations. In another configuration, the uplink control component 424 may be configured to receive power information 430 associated with the station. The power information may include a headroom value, and the power control command may be determined based on the headroom value. In another aspect, the power information may further include a flag indicating whether the station is transmitting at a minimum transmit power associated with an MCS index. In another aspect, the power control command may be directed to a single station performing UL MU-MIMO or UL OFDMA transmissions in a wireless local area network.

The various components of the wireless device 402 may be coupled together by a bus system 426. The bus system 426 may include a data bus, for example, as well as a power bus, a control signal bus, and a status signal bus in addition to the data bus. Components of the wireless device 402 may be coupled together or accept or provide inputs to each other using some other mechanism.

Although a number of separate components are illustrated in FIG. 4, one or more of the components may be combined or commonly implemented. For example, the processor 404 may be used to implement not only the functionality described above with respect to the processor 404, but also to implement the functionality described above with respect to the signal detector 418, the DSP 420, the user interface 422, and/or the uplink control component 424. Further, each of the components illustrated in FIG. 4 may be implemented using a plurality of separate elements.

Figure 5:
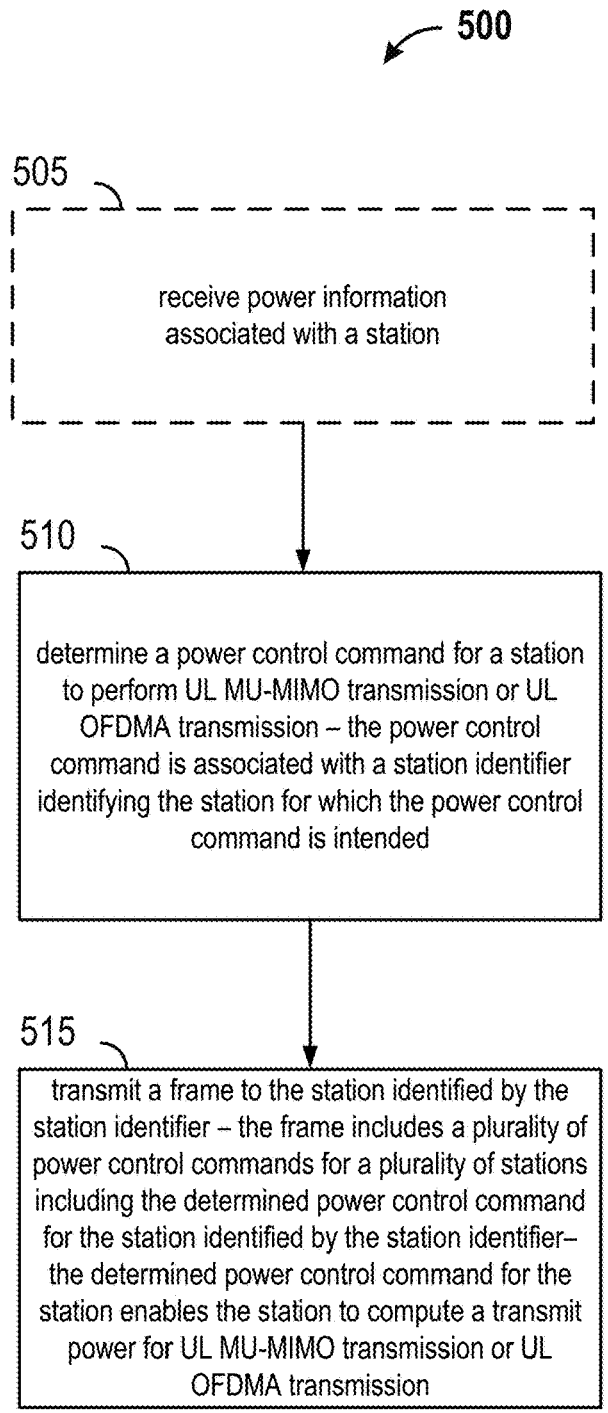
FIG. 5 is a flowchart of an example method of wireless communication for power control by an access point.

FIG. 5 is a flowchart of an example method 500 of wireless communication for power control by an access point. The method 500 may be performed using an apparatus (e.g., the AP 104 or the wireless device 402, for example). Although the method 500 is described below with respect to the elements of wireless device 402 of FIG. 4, other components may be used to implement one or more of the steps described herein. The dotted lines with respect to the various blocks represent optional blocks.

At block 505, the apparatus may receive power information associated with a station. The power information may include a headroom value, rise over floor information, a current transmit power of the station associated with an assigned MCS, a maximum transmit power associated with the MCS, a minimum transmit power of the station, and/or back-off values associated with each MCS for the station. For example, referring to FIG. 2, the AP 202 may receive power information associated with the STA 204.

At block 510, the apparatus may determine a power control command for UL MU-MIMO transmission or UL OFDMA transmission. The power control command may be associated with a station identifier identifying the station for which the power control command is intended. For example, referring to FIG. 2, the AP 202 may determine the power control command for the STA 204 for uplink transmission. The power control command may be associated with a STA ID that identifies the STA 204. The AP 202 may determine the power control command based on received power control capabilities from the STA 204 and/or on the number of users requesting uplink transmission. For example, the AP 202 may determine the headroom at the STA 204 and the minimum transmit power of the STA 204. Based on the headroom or the minimum transmit power of the STA 204, the AP 202 may determine a target RSSI at the AP 202.

At block 515, the apparatus may transmit a frame to the station identified by the station identifier. The frame includes a plurality of power control commands for a plurality of stations including the determined power control command for the station identified by the station identifier. The determined power control command for the station enables the station to compute a transmit power for UL MU-MIMO transmission or UL OFDMA transmission. For example, referring to FIG. 2, the AP 202 may transmit a trigger frame to the STA 204, and the trigger frame may include a STA ID that identifies the STA. The trigger frame may include the determine power control command used for uplink transmission by the STA 204. For example, the STA 204 may indicate the target RSSI. Subsequently, the STA 204 may transmit data to the AP 202. Based on the received data, the AP 202 may adjust the target RSSI to be transmitted to the STA 204 for subsequent transmissions.

Figure 6:
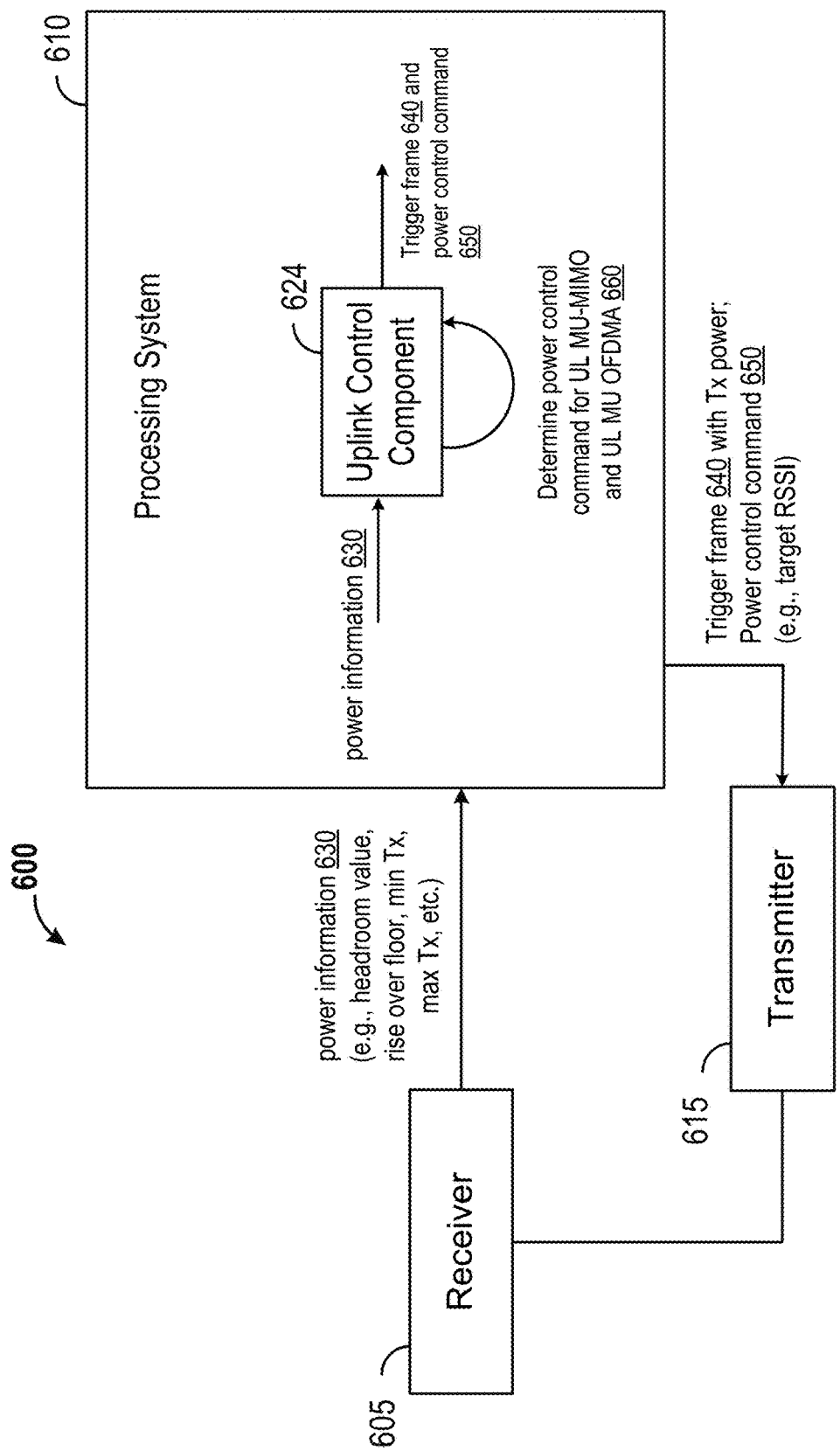
FIG. 6 is a functional block diagram of an example wireless communication device configured for controlling uplink MU transmissions.

FIG. 6 is a functional block diagram of an example wireless communication device 600 configured for controlling uplink MU transmissions. The wireless communication device 600 may include a receiver 605, a processing system 610, and a transmitter 615. The processing system 610 may include an uplink control component 624. The processing system 610 and/or the uplink control component 624 may be configured to determine 660 a power control command 650 for a station that enables UL MU-MIMO transmission or UL OFDMA transmission. The power control command may be associated with a station identifier identifying the station for which the power control command is intended. The processing system 610, the uplink control component 624, and/or the transmitter 615 may be configured to transmit a frame to the station identified by the station identifier. The frame may include the determined power control command for UL MU-MIMO or UL OFDMA and the station identifier. The determined power control command for the station may be different (or separate) from other power control commands for other stations associated with the wireless communication device 600. In an aspect, the power control command may indicate at least one of a target RSSI expected at the wireless communication device 600, an SNR correction to be applied at the station, or a link margin. In another aspect, the frame may be a trigger frame 640, and the trigger frame may include the target RSSI and a transmit power level used by the wireless communication device 600 to transmit the trigger frame. In another aspect, the target RSSI may indicate an average RSSI over a set of antennas associated with the wireless communication device 600. In another aspect, the trigger frame may be intended for a plurality of stations, and the trigger frame may include a separate power control command for each station of the plurality of stations. In another configuration, the processing system 610, the receiver 605, and/or the uplink control component 624 may be configured to receive power information 630 associated with the station. The power information may include a headroom value, and the power control command may be determined based on the headroom value. In another aspect, the power information may further include a flag indicating whether the station is transmitting at a minimum transmit power associated with an MCS index. In another aspect, the power control command may be directed to a single station performing UL MU-MIMO or UL OFDMA transmissions in a wireless local area network.

The receiver 605, the processing system 610, the uplink control component 624, and/or the transmitter 615 may be configured to perform one or more functions discussed above with respect to blocks 505, 510, and 515 of FIG. 5. The receiver 605 may correspond to the receiver 412. The processing system 610 may correspond to the processor 404. The transmitter 615 may correspond to the transmitter 410. The uplink control component 624 may correspond to the uplink control component 124 and/or the uplink control component 424.

In one configuration, the wireless communication device 600 includes means for determining a power control command for a station that enables UL MU-MIMO transmission or UL OFDMA transmission. The power control command may be associated with a station identifier identifying the station for which the power control command is intended. The wireless communication device 600 may include means for transmitting a frame to the station identified by the station identifier. The frame may include the determined power control command for UL MU-MIMO or UL OFDMA and the station identifier. The determined power control command for the station may be different (or separate) from other power control commands for other stations associated with the wireless communication device 600. In an aspect, the power control command may indicate at least one of a target RSSI expected at the wireless communication device 600, an SNR correction to be applied at the station, or a link margin. In another aspect, the frame may be a trigger frame, and the trigger frame may include the target RSSI and a transmit power level used by the wireless communication device 600 to transmit the trigger frame. In another aspect, the target RSSI may indicate an average RSSI over a set of antennas associated with the wireless communication device 600. In another aspect, the trigger frame may be intended for a plurality of stations, and the trigger frame may include a separate power control command for each station of the plurality of stations. In another configuration, the wireless communication device 600 may include means for receiving power information associated with the station. The power information may include a headroom value, and the power control command may be determined based on the headroom value. In another aspect, the power information may further include a flag indicating whether the station is transmitting at a minimum transmit power associated with an MCS index. In another aspect, the power control command may be directed to a single station performing UL MU-MIMO or UL OFDMA transmissions in a wireless local area network.

For example, means for determining a power control command may include the processing system 610 and/or the uplink control component 624. Means for transmitting a frame may include the processing system 610 and/or the transmitter 615. Means for receiving power information may include the processing system 610 and/or the receiver 605.

Figure 7:
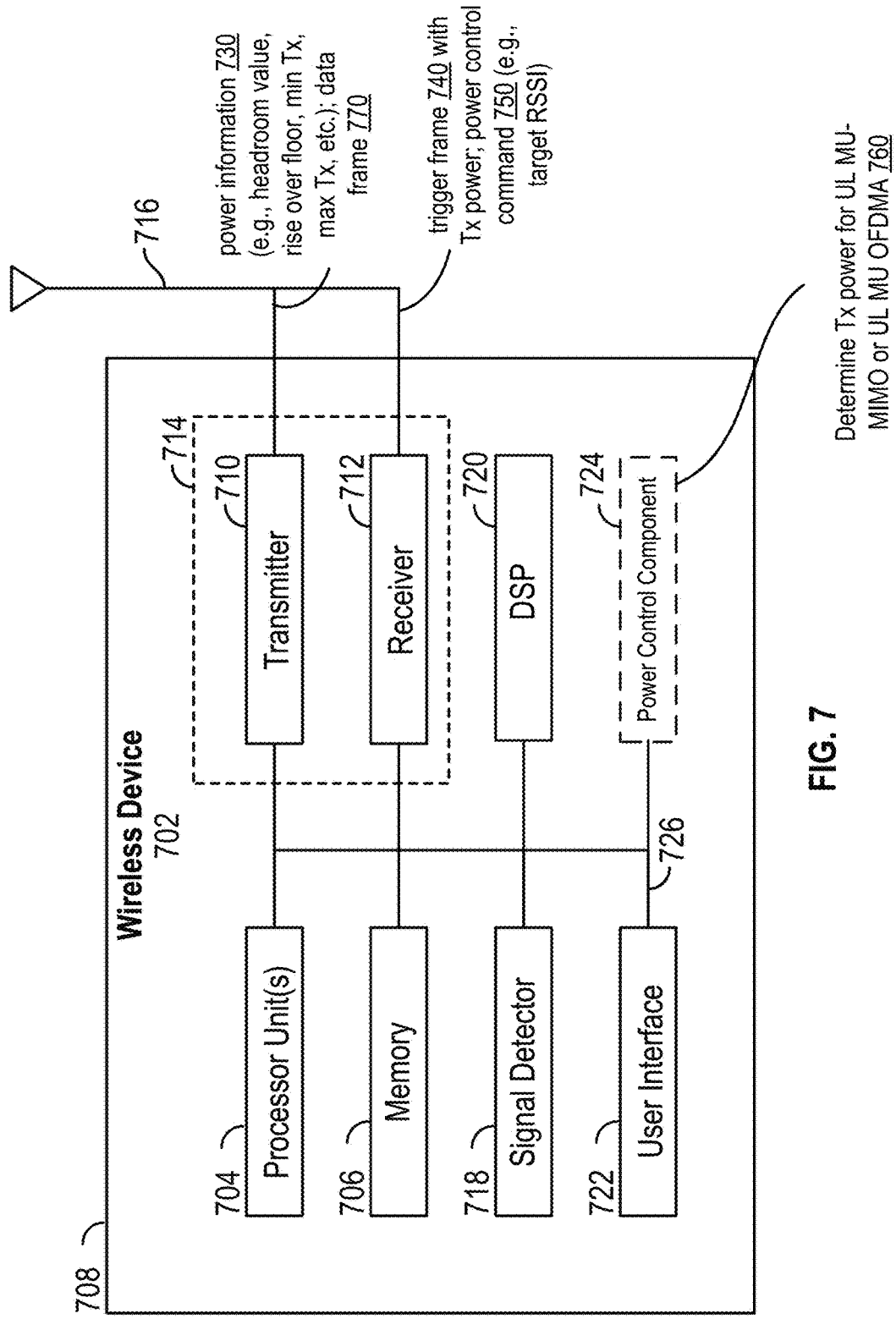
FIG. 7 shows an example functional block diagram of a wireless device that may be employed within the wireless communication system of FIG. 1.

FIG. 7 shows an example functional block diagram of a wireless device 702 with uplink power control that may be employed within the wireless communication system 100 of FIG. 1. The wireless device 702 is an example of a device that may be configured to implement the various methods described herein. For example, the wireless device 702 may comprise the STA 114 or the STA 204.

The wireless device 702 may include a processor 704 which controls operation of the wireless device 702. The processor 704 may also be referred to as a CPU. Memory 706, which may include both ROM and RAM, may provide instructions and data to the processor 704. A portion of the memory 706 may also include NVRAM. The processor 704 typically performs logical and arithmetic operations based on program instructions stored within the memory 706. The instructions in the memory 706 may be executable (by the processor 704, for example) to implement the methods described herein.

The processor 704 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 702 may also include a housing 708, and the wireless device 702 may include a transmitter 710 and/or a receiver 712 to allow transmission and reception of data between the wireless device 702 and a remote device. The transmitter 710 and the receiver 712 may be combined into a transceiver 714. An antenna 716 may be attached to the housing 708 and electrically coupled to the transceiver 714. The wireless device 702 may also include multiple transmitters, multiple receivers, multiple transceivers, and/or multiple antennas.

The wireless device 702 may also include a signal detector 718 that may be used to detect and quantify the level of signals received by the transceiver 714 or the receiver 712. The signal detector 718 may detect such signals as total energy, energy per subcarrier per symbol, power spectral density, and other signals. The wireless device 702 may also include a DSP 720 for use in processing signals. The DSP 720 may be configured to generate a packet for transmission. In some aspects, the packet may comprise a PPDU.

The wireless device 702 may further comprise a user interface 722 in some aspects. The user interface 722 may comprise a keypad, a microphone, a speaker, and/or a display. The user interface 722 may include any element or component that conveys information to a user of the wireless device 702 and/or receives input from the user.

When the wireless device 702 is implemented as a station (e.g., the STA 114 or the STA 204), the wireless device 702 may also comprise a power control component 724. The power control component 724 may be configured to receive a first frame from an access point that includes a power control command to be used by the wireless device 702 for UL MU-MIMO transmission or UL OFDMA transmission. The power control command for the wireless device 702 may be different (or separate) from other power control commands for other stations associated with the access point. The power control component 724 may be configured to determine a transmit power for transmitting a second frame to the access point based on the received power control command. The power control component 724 may be configured to transmit the second frame based on the determined transmit power. In an aspect, the power control command may indicate at least one of a target RSSI expected at the access point, an SNR correction to be applied at the wireless device 702, or a link margin. In another aspect, the first frame may be a trigger frame. The trigger frame may include the target RSSI at the access point and a second transmit power used by the access point to transmit the trigger frame. In another configuration, the power control component 724 may be configured to determine the transmit power by computing a downlink pathloss between the access point and the wireless device 702 and by adding the measured downlink pathloss to the target RSSI. In this configuration, the transmit power may be a sum of the measured downlink pathloss and the target RSSI. In one configuration, the power control component 724 may be configured to compute the downlink pathloss comprises by measuring an RSSI of the trigger frame and by subtracting the measured RSSI from the second transmit power used by the access point to transmit the trigger frame. In this configuration, the downlink pathloss may be a difference between the second transmit power and the measured RSSI. In another configuration, the power control component 724 may be configured to transmit power information to the access point. The power information may include at least one of headroom information, rise over floor information, a current transmit power associated with an MCS, a maximum transmit power associated with the MCS, a minimum transmit power of the station, or back-off values associated with each MCS. In this configuration, the power control command in the first message may be based on the transmitted power information.

The various components of the wireless device 702 may be coupled together by a bus system 726. The bus system 726 may include a data bus, for example, as well as a power bus, a control signal bus, and a status signal bus in addition to the data bus. Components of the wireless device 702 may be coupled together or accept or provide inputs to each other using some other mechanism.

Although a number of separate components are illustrated in FIG. 7, one or more of the components may be combined or commonly implemented. For example, the processor 704 may be used to implement not only the functionality described above with respect to the processor 704, but also to implement the functionality described above with respect to the signal detector 718, the DSP 720, the user interface 722, and/or the power control component 724. Further, each of the components illustrated in FIG. 7 may be implemented using a plurality of separate elements.

Figure 8:
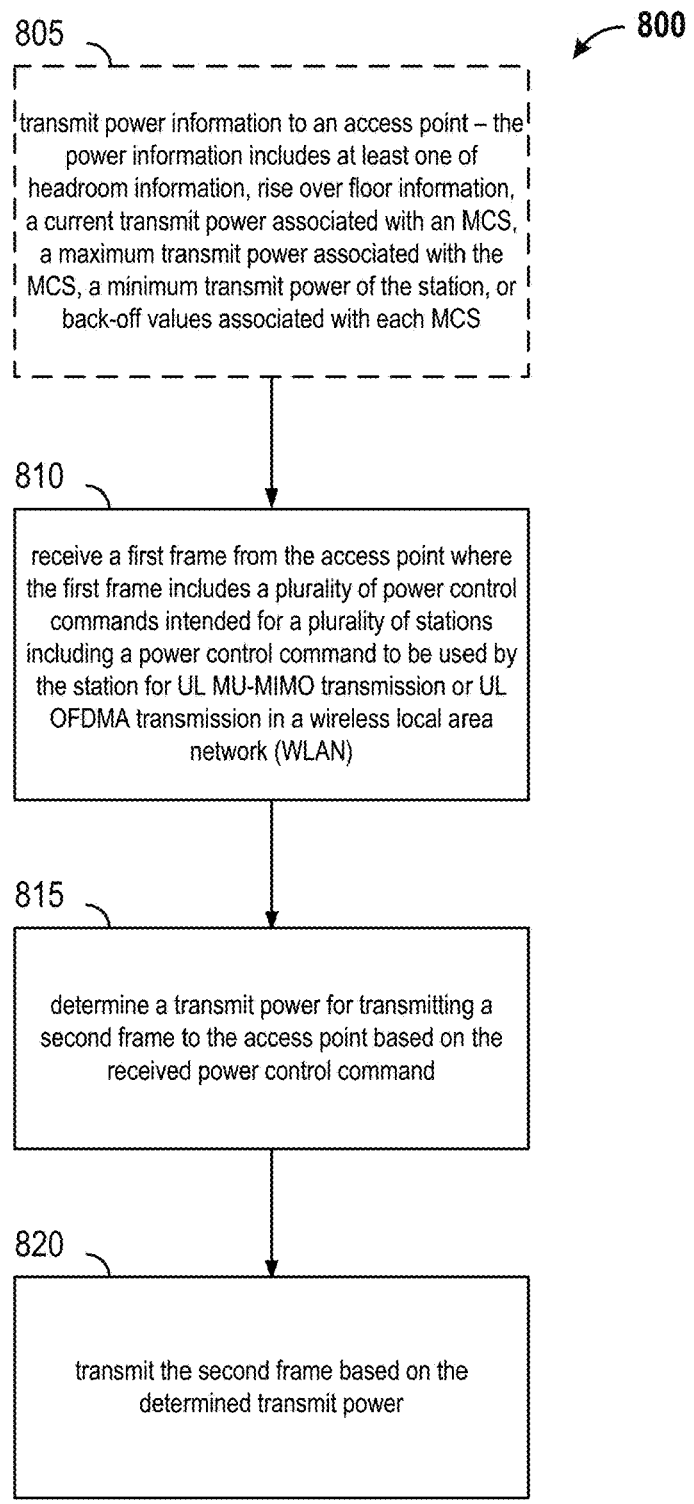
FIG. 8 is a flowchart of an example method of wireless communication for power control by a station.

FIG. 8 is a flowchart of an example method 800 of wireless communication for power control by a station. The method 800 may be performed using an apparatus (e.g., the STA 114 or the wireless device 702, for example). Although the method 800 is described below with respect to the elements of wireless device 702 of FIG. 7, other components may be used to implement one or more of the steps described herein. The dotted lines with respect to the various blocks represent optional blocks.

At block 805, the apparatus may transmit power information to an access point. The power information may include at least one of headroom information, rise over floor information, a current transmit power associated with an MCS, a maximum transmit power associated with the MCS, a minimum transmit power of the station, and/or back-off values associated with each MCS supported by the apparatus. For example, referring to FIG. 2, the STA 204 may transmit power information that includes headroom information, a current transmit power associated with an MCS, and a rise over floor information associated with the STA.

At block 810, the apparatus may receive a first frame from the access point that may include a plurality of power control commands intended for a plurality of stations including a power control command to be used by the apparatus for UL MU-MIMO transmission or UL OFDMA transmission in a wireless local area network (WLAN). For example, referring to FIG. 2, the STA 204 may receive a trigger frame from the AP 202 that includes a target RSSI to be used by the STA 204 for uplink transmission.

At block 815, the apparatus may determine a transmit power for transmitting a second frame to the access point based on the power control command. For example, referring to FIG. 2, the STA 204 may determine a Tx power for transmitting a frame to the AP 202 based on the target RSSI. The Tx power may be determined as the sum of the target RSSI and the downlink pathloss measured from the received trigger frame.

At block 820, the apparatus may transmit the second frame based on the determined transmit power. For example, referring to FIG. 2, the STA 204 may transmit the uplink frame based on the determined Tx power.

Figure 9:
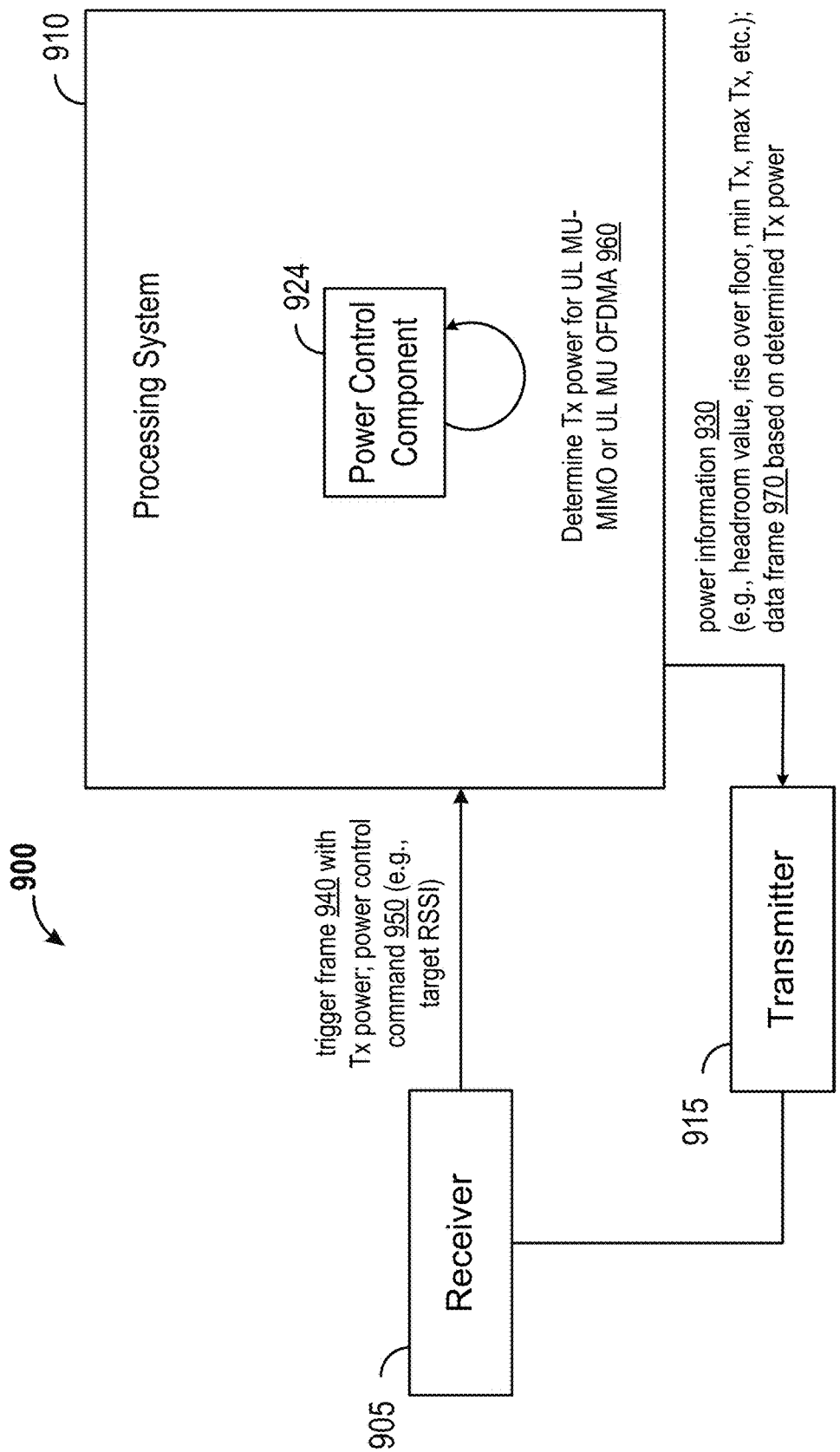
FIG. 9 is a functional block diagram of an example wireless communication device configured for power control.

FIG. 9 is a functional block diagram of an example wireless communication device 900 configured for power control. The wireless communication device 900 may include a receiver 905, a processing system 910, and a transmitter 915. The processing system 910 may include a power control component 924. The receiver 905, the processing system 910, the transmitter 915, and/or the power control component 924 may be configured to receive a first frame from an access point that includes a power control command 950 to be used by the wireless communication device 900 for UL MU-MIMO transmission or UL OFDMA transmission. The power control command for the wireless communication device 900 may be different (or separate) from other power control commands for other stations associated with the access point. The processing system 910 and/or the power control component 924 may be configured to determine 960 a transmit power for transmitting a second frame to the access point based on the received power control command. The processing system 910, the transmitter 915, and/or the power control component 924 may be configured to transmit the second frame (e.g., a data frame 970) based on the determined transmit power. In an aspect, the power control command may indicate at least one of a target RSSI expected at the access point, an SNR correction to be applied at the wireless communication device 900, or a link margin. In another aspect, the first frame may be a trigger frame 940. The trigger frame may include the target RSSI at the access point and a second transmit power used by the access point to transmit the trigger frame. In another configuration, the processing system 910 and/or the power control component 924 may be configured to determine the transmit power by computing a downlink pathloss between the access point and the wireless communication device 900 and by adding the measured downlink pathloss to the target RSSI. In this configuration, the transmit power may be a sum of the measured downlink pathloss and the target RSSI. In one configuration, the power control component 924 and/or the processing system 910 may be configured to compute the downlink pathloss comprises by measuring an RSSI of the trigger frame and by subtracting the measured RSSI from the second transmit power used by the access point to transmit the trigger frame. In this configuration, the downlink pathloss may be a difference between the second transmit power and the measured RSSI. In another configuration, the power control component 924, the processing system 910, and/or the transmitter 915 may be configured to transmit power information 930 to the access point. The power information may include at least one of headroom information, rise over floor information, a current transmit power associated with an MCS, a maximum transmit power associated with the MCS, a minimum transmit power of the station, or back-off values associated with each MCS. In this configuration, the power control command in the first message may be based on the transmitted power information.

The receiver 905, the processing system 910, the power control component 924, and/or the transmitter 915 may be configured to perform one or more functions discussed above with respect to blocks 805, 810, 815, and 820 of FIG. 8. The receiver 905 may correspond to the receiver 712. The processing system 910 may correspond to the processor 704. The transmitter 915 may correspond to the transmitter 710. The power control component 924 may correspond to the power control component 126 and/or the power control component 724.

In one configuration, the wireless communication device 900 includes means for receiving a first frame from an access point that includes a power control command to be used by the wireless communication device 900 for UL MU-MIMO transmission or UL OFDMA transmission. The power control command for the wireless communication device 900 may be different (or separate) from other power control commands for other stations associated with the access point. The wireless communication device 900 may include means for determining a transmit power for transmitting a second frame to the access point based on the received power control command. The wireless communication device 900 may include means for transmitting the second frame based on the determined transmit power. In an aspect, the power control command may indicate at least one of a target RSSI expected at the access point, an SNR correction to be applied at the wireless communication device 900, or a link margin. In another aspect, the first frame may be a trigger frame. The trigger frame may include the target RSSI at the access point and a second transmit power used by the access point to transmit the trigger frame. In another configuration, the means for determining the transmit power may be configured to compute a downlink pathloss between the access point and the wireless communication device 900 and to add the measured downlink pathloss to the target RSSI. In this configuration, the transmit power may be a sum of the measured downlink pathloss and the target RSSI. In one configuration, the means for determining the transmit power may be configured to compute the downlink pathloss by measuring an RSSI of the trigger frame and by subtracting the measured RSSI from the second transmit power used by the access point to transmit the trigger frame. In this configuration, the downlink pathloss may be a difference between the second transmit power and the measured RSSI. In another configuration, the wireless communication device 900 may include means for transmitting power information to the access point. The power information may include at least one of headroom information, rise over floor information, a current transmit power associated with an MCS, a maximum transmit power associated with the MCS, a minimum transmit power of the station, or back-off values associated with each MCS. In this configuration, the power control command in the first message may be based on the transmitted power information.

For example, means for receiving a first frame may include the processing system 910, the power control component 924, and/or the receiver 905. Means for determining a transmit power may include the processing system 910 and/or the power control component 924. Means for transmitting the second frame may include the processing system 910, the power control component 924, and/or the transmitter 915. Means for transmitting power information may include the processing system 910, the power control component 924, and/or the transmitter 915.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication, comprising:
   determining, by a first wireless communication device, a first power control command for use by a second wireless communication device in an uplink (UL)

multi-user (MU) multiple-input-multiple-output (MIMO) (UL MU-MIMO) transmission or an UL orthogonal frequency-division multiple access (UL OFDMA) transmission, the first power control command indicating a target received signal strength indicator (RSSI) for the UL-MU-MIMO or UL OFDMA transmission; and transmitting, by the first wireless communication device, a trigger frame to the second wireless communication device that includes the first power control command and an associated identifier identifying the second wireless communication device, the trigger frame further including a transmit power level used by the first wireless communication device in transmitting the trigger frame.

2. The method of claim 1, further comprising determining one or more additional power control commands for use by one or more respective additional wireless communication devices for the UL MU-MIMO or UL OFDMA transmission, at least one of the additional power control commands being different than the first power control command.

3. The method of claim 2, wherein the one or more additional power control commands each includes an associated identifier for identifying a respective one of the additional wireless communication devices.

4. The method of claim 1, wherein the first power control command further indicates a signal-to-noise ratio (SNR) correction or a link margin for the UL MU-MIMO or UL OFDMA transmission.

5. The method of claim 1, wherein the trigger frame further includes a plurality of user information fields, a first of the user information fields including the target RSSI.

6. The method of claim 5, wherein the trigger frame further includes a common information field that indicates the transmit power level.

7. The method of claim 1, wherein the power control command and the transmit power level enable the second wireless communication device to compute a transmit power for the UL MU-MIMO or UL OFDMA transmission, wherein the method further includes receiving, by the first wireless communication device, a frame of the UL-MU-MIMO or UL OFDMA transmission from the second wireless communication device based on the computed transmit power.

8. The method of claim 1, wherein the target RSSI indicates an average RSSI over a set of antennas of the first wireless communication device receiving the UL-MU-MIMO or UL OFDMA transmission.

9. The method of claim 1, further comprising receiving, by the first wireless communication device, power information associated with the second wireless communication device, wherein the power information comprises a headroom value, wherein the headroom value corresponds to a maximum increase in the target RSSI.

10. The method of claim 9, wherein the power information further comprises a flag indicating whether the second wireless communication device is transmitting at a minimum transmit power associated with a modulation and coding scheme (MCS) index, and wherein the target RSSI is increased or stays the same when the second wireless communication device is transmitting at the minimum transmit power.

11. A method for wireless communication, comprising:
receiving, by a first wireless communication device, a trigger frame from a second wireless communication device, the trigger frame including a first power control command for use by the first wireless communication device in an uplink (UL) multi-user (MU) multiple-input-multiple-output (MIMO) (UL MU-MIMO) transmission or an UL orthogonal frequency-division multiple access (UL OFDMA) transmission, the first power control command indicating a target received signal strength indicator (RSSI) for the UL MU-MIMO or UL OFDMA transmission, the trigger frame further including an associated identifier identifying the first wireless communication device and a transmit power level used by the second wireless communication device in transmitting the trigger frame;

determining a transmit power for transmitting a frame to the second wireless communication device for the UL MU-MIMO or UL OFDMA transmission, the determination of the transmit power being based on the first power control command and the transmit power level; and transmitting the frame based on the transmit power.

12. The method of claim 11, wherein the first power control command further indicates a signal-to-noise ratio (SNR) correction or a link margin for the UL MU-MIMO or UL OFDMA transmission.

13. The method of claim 11, wherein the trigger frame further includes a plurality of user information fields, a first of the user information fields including the target RSSI.

14. The method of claim 13, wherein the trigger frame further includes a common information field that indicates the transmit power level.

15. The method of claim 11, wherein the trigger frame includes one or more additional power control commands for use by one or more respective additional wireless communication devices for the UL MU-MIMO or UL OFDMA transmission, at least one of the additional power control commands being different than the first power control command.

16. The method of claim 15, wherein the one or more additional power control commands each includes an associated identifier for identifying a respective one of the additional wireless communication devices.

17. The method of claim 11, wherein the determining the transmit power comprises:
computing a downlink pathloss between the second wireless communication device and the first wireless communication device; and
adding the measured downlink pathloss to the target RSSI, wherein the transmit power is a sum of the measured downlink pathloss and the target RSSI.

18. The method of claim 17, wherein the computing the downlink pathloss comprises:
measuring an RSSI of the trigger frame; and
subtracting the measured RSSI from the transmit power level used by the second wireless communication device to transmit the trigger frame, wherein the downlink pathloss is a difference between the transmit power level and the measured RSSI.

19. The method of claim 11, further comprising:
transmitting, by the first wireless communication device, power information to the second wireless communication device, wherein the power information includes at least one of headroom information, rise over floor information, a current transmit power associated with a modulation and coding scheme (MCS), a maximum transmit power associated with the MCS, a minimum transmit power of first wireless communication device, or back-off values associated with each MCS, wherein the power control command in the trigger frame is based on the transmitted power information.

20. A first wireless communication device, comprising:
at least one processor; and
at least one memory communicatively coupled with the at least one processor and storing processor-readable code that, when executed by the at least one processor, causes the first wireless communication device to:
determine a first power control command for use by a second wireless communication device in an uplink (UL) multi-user (MU) multiple-input-multiple-output (MIMO) (UL MU-MIMO) transmission or an UL orthogonal frequency-division multiple access (UL OFDMA) transmission, the first power control command indicating a target received signal strength indicator (RSSI) for the UL-MU-MIMO or UL OFDMA transmission; and
transmit a trigger frame to the second wireless communication device that includes the first power control command and an associated identifier identifying the second wireless communication device, the trigger frame further including a transmit power level used by the first wireless communication device in transmitting the trigger frame.

21. The first wireless communication device of claim 20, wherein the at least one processor is further configured to determine one or more additional power control commands for use by one or more respective additional wireless communication devices for the UL MU-MIMO or UL OFDMA transmission, at least one of the additional power control commands being different than the first power control command.

22. The first wireless communication device of claim 20, wherein the first power control command further indicates a signal-to-noise ratio (SNR) correction or a link margin for the UL MU-MIMO or UL OFDMA transmission.

23. The first wireless communication device of claim 20, wherein the trigger frame further includes a plurality of user information fields, a first of the user information fields including the target RSSI.

24. The first wireless communication device of claim 23, wherein the trigger frame further includes a common information field that indicates the transmit power level.

25. The first wireless communication device of claim 20, wherein the at least one processor is further configured to receive a frame of the UL-MU-MIMO or UL OFDMA transmission from the second wireless communication device, wherein a transmit power for the frame is determined based on the power control command and the transmit power level.

26. The first wireless communication device of claim 20, wherein the target RSSI indicates an average RSSI over a set of antennas of the first wireless communication device receiving the UL-MU-MIMO or UL OFDMA transmission.

27. The first wireless communication device of claim 20, wherein the at least one processor is further configured to receive power information associated with the second wireless communication device, wherein the power information comprises a headroom value, wherein the headroom value corresponds to a maximum increase in the target RSSI.

28. The first wireless communication device of claim 20, wherein the power information further comprises a flag indicating whether the second wireless communication device is transmitting at a minimum transmit power associated with a modulation and coding scheme (MCS) index, and wherein the target RSSI is increased or stays the same when the second wireless communication device is transmitting at the minimum transmit power.

29. A first wireless communication device, comprising:
at least one processor; and
at least one memory communicatively coupled with the at least one processor and storing processor-readable code that, when executed by the at least one processor, causes the first wireless communication device to:
receive a trigger frame from a second wireless communication device, the trigger frame including a first power control command for use by the first wireless communication device in an uplink (UL) multi-user (MU) multiple-input-multiple-output (MIMO) (UL MU-MIMO) transmission or an UL orthogonal frequency-division multiple access (UL OFDMA) transmission, the first power control command indicating a target received signal strength indicator (RSSI) for the UL MU-MIMO or UL OFDMA transmission, the trigger frame further including an associated identifier identifying the first wireless communication device and a transmit power level used by the second wireless communication device in transmitting the trigger frame;
determine a transmit power for transmitting a frame to the second wireless communication device for the UL MU-MIMO or UL OFDMA transmission, the determination of the transmit power being based on the first power control command and the transmit power level; and
transmit the frame based on the transmit power.

30. The first wireless communication device of claim 29, wherein the first power control command further indicates a signal-to-noise ratio (SNR) correction or a link margin for the UL MU-MIMO or UL OFDMA transmission.

31. The first wireless communication device of claim 29, wherein the trigger frame further includes a plurality of user information fields, a first of the user information fields including the target RSSI.

32. The first wireless communication device of claim 31, wherein the trigger frame further includes a common information field that indicates the transmit power level.

33. The first wireless communication device of claim 29, wherein the trigger frame includes one or more additional power control commands for use by one or more respective additional wireless communication devices for the UL MU-MIMO or UL OFDMA transmission, at least one of the additional power control commands being different than the first power control command.

34. The first wireless communication device of claim 29, wherein the at least one processor configured to determine the transmit power is further configured to:
compute a downlink pathloss between the second wireless communication device and the first wireless communication device; and
add the measured downlink pathloss to the target RSSI, wherein the transmit power is a sum of the measured downlink pathloss and the target RSSI.

35. The first wireless communication device of claim 34, wherein the at least one processor configured to compute the downlink pathloss is further configured to:
measure an RSSI of the trigger frame; and
subtract the measured RSSI from the transmit power level used by the second wireless communication device to transmit the trigger frame, wherein the downlink pathloss is a difference between the transmit power level and the measured RSSI.

36. The first wireless communication device of claim 29, wherein the at least one processor is further configured to transmit power information to the second wireless communication device, wherein the power information includes at least one of headroom information, rise over floor information, a current transmit power associated with a modulation and coding scheme (MCS), a maximum transmit power associated with the MCS, a minimum transmit power of first wireless communication device, or back-off values associated with each MCS, wherein the power control command in the trigger frame is based on the power information.

* * * * *